(12) United States Patent
Ikai et al.

(10) Patent No.: US 12,054,622 B2
(45) Date of Patent: Aug. 6, 2024

(54) OIL-BASED INK COMPOSITION FOR WRITING UTENSILS, WRITING UTENSIL USING SAME, AND AIRBRUSH UNIT USING SAME

(71) Applicant: MITSUBISHI PENCIL COMPANY, LIMITED, Tokyo (JP)

(72) Inventors: Takayuki Ikai, Tokyo (JP); Yumiko Haruhara, Tokyo (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 300 days.

(21) Appl. No.: 17/294,523

(22) PCT Filed: Nov. 19, 2019

(86) PCT No.: PCT/JP2019/045202
§ 371 (c)(1),
(2) Date: May 17, 2021

(87) PCT Pub. No.: WO2020/105613
PCT Pub. Date: May 28, 2020

(65) Prior Publication Data
US 2022/0017760 A1 Jan. 20, 2022

(30) Foreign Application Priority Data
Nov. 20, 2018 (JP) .................. 2018-216947

(51) Int. Cl.
*C09D 11/00* (2014.01)
*B43K 8/00* (2006.01)
*C09D 11/17* (2014.01)

(52) U.S. Cl.
CPC .............. *C09D 11/17* (2013.01); *B43K 8/006* (2013.01)

(58) Field of Classification Search
CPC .................. C09D 11/17; B43K 8/006
(Continued)

(56) References Cited

U.S. PATENT DOCUMENTS 8,771,410 B2    7/2014 Otsubo et al.
2011/0271870 A1  11/2011 Hitchcock et al.
(Continued)

FOREIGN PATENT DOCUMENTS

EP    2383315 A1    11/2011
JP    S5974147 A  *  4/1984
(Continued)

OTHER PUBLICATIONS

International Search Report (PCT/ISA/210) with an English translation, and Written Opinion (PCT/ISA/237) mailed on Dec. 24, 2019, by the Japanese Patent Office as the International Searching Authority for International Application No. PCT/JP2019/045202. (10 pages).
Extended European Search Report issued on Jul. 18, 2022, by the European Patent Office in corresponding European Application No. 19887305.1 (6 pages).

*Primary Examiner* — James E McDonough
(74) *Attorney, Agent, or Firm* — BUCHANAN, INGERSOLL & ROONEY PC

(57) ABSTRACT

Provided are an oil-based ink composition for writing utensils, a writing utensil using the same, and an airbrush unit using the same. The oil-based ink composition for writing utensils has good writing properties on writing surfaces of various materials and improved scratch resistance to scratches repeated or to scratches with stronger force on a marking after writing. The subject oil-based ink composition for writing utensils contains at least an aluminum pigment, a colorant, a resin, an organic solvent, and a polydimethylsiloxane, the polydimethylsiloxane having polyether-modi-
(Continued)

fying groups at both ends, and a total number of hydroxyl groups on the polyether-modifying groups being 3 or greater.

4 Claims, 1 Drawing Sheet

(58) Field of Classification Search
USPC .......................................... 106/31.01, 31.13
See application file for complete search history.

(56) References Cited

U.S. PATENT DOCUMENTS

2013/0324653 A1* 12/2013 Bollard ............... C08F 2/18
　　　　　　　　　　　　　　　　　　524/251
2016/0200922 A1* 7/2016 Sugamoto ............ C09D 7/61
　　　　　　　　　　　　　　　　　　427/160

FOREIGN PATENT DOCUMENTS

| JP | S-5974147 A | * | 4/1984 |
| JP | S5974174 A | | 4/1984 |
| JP | H05-32926 A | | 2/1993 |
| JP | H0532926 A | | 2/1993 |
| JP | 2006124456 A | | 5/2006 |
| JP | 2008-208292 A | | 9/2008 |
| JP | 2010-221479 A | | 10/2010 |
| JP | 3173489 U | | 2/2012 |
| JP | 2012-102310 A | | 5/2012 |
| JP | 201395843 A | * | 5/2013 |
| JP | 2013095846 A | * | 5/2013 |
| JP | 2013095846 A | | 5/2013 |
| JP | 2017052836 A | | 3/2017 |
| WO | 2018216315 A1 | | 11/2018 |

* cited by examiner

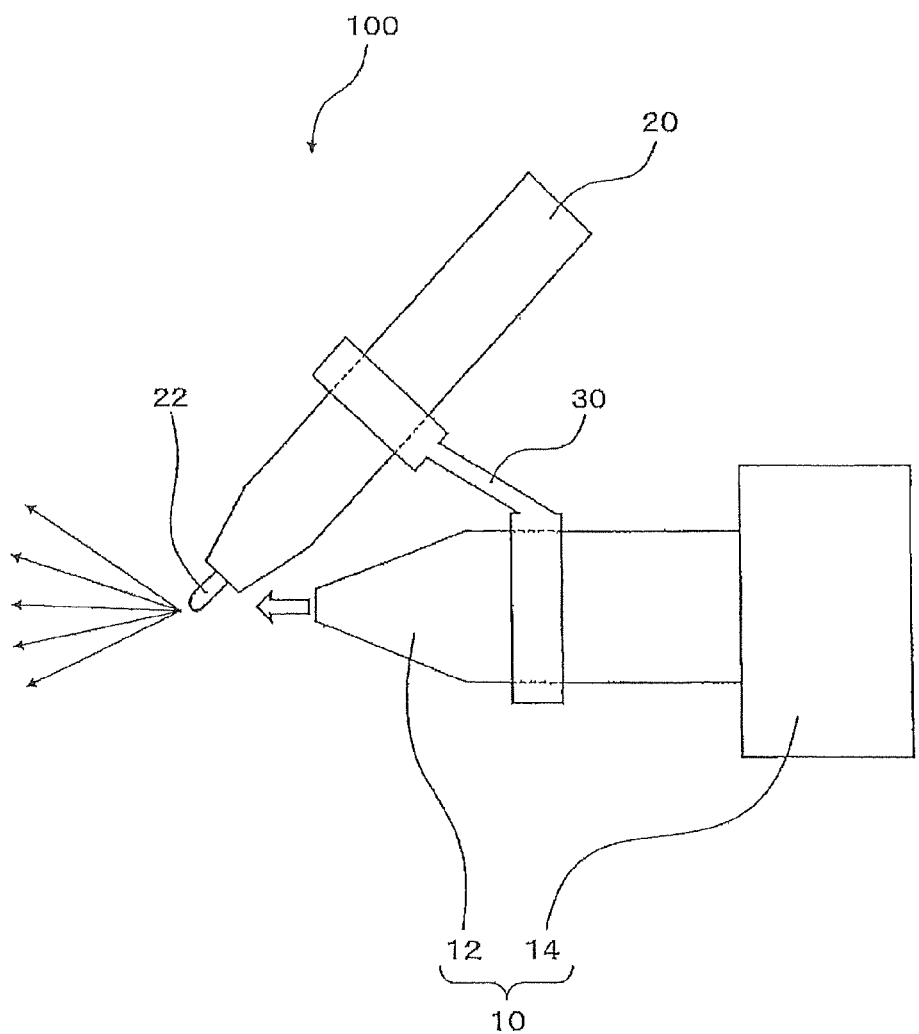

OIL-BASED INK COMPOSITION FOR WRITING UTENSILS, WRITING UTENSIL USING SAME, AND AIRBRUSH UNIT USING SAME

TECHNICAL FIELD

The present invention relates to an oil-based ink composition for writing utensils, a writing utensil using the same, and an airbrush unit using the same.

BACKGROUND ART

In the related art, various colorants are used in oil-based inks for marking pens. One of such colorants is metal powder, a representative example of which includes an aluminum pigment, which has been commonly used to impart a metallic luster in drawn lines. An aluminum pigment has a large total length of several μm, and thus, has a tendency of being easily peeled off when scratched by a finger or the like unless sufficient adherence to a writing surface is imparted.

Writing utensils using oil-based ink compositions are used to write on an object not limited to ordinary paper, which has liquid permeability, but including paper with its surface coated with a resin; plastic; glass; and metal. Oil-based inks are required to produce markings that have sufficient adherence to such a wide variety of objects and resistance to scratching.

Furthermore, an ink composition using a combination of an aluminum pigment and a common colorant can produce markings with a color having a metallic luster, as a certain amount of the colorant covers an aluminum pigment surface. However, unless sufficient affinity and adherence are present between the aluminum pigment and the colorant, the colorant may be solely peeled off by scratching, resulting in a silver marking.

Patent Document 1 discloses a metal powder pigment ink composition for oil-based marking pens, the metal powder pigment ink composition containing an organic solvent, a metal powder pigment, and resins, in which the resins are a combination of at least one first resin selected from ketone resins, hydrogenated rosin resins, and ultra-light color rosin resins, and at least one second resin selected from acrylic resins, styrene-acrylic resins, and styrene-maleic resins.

However, the metal powder pigment ink composition for oil-based marking pens of Patent Document 1 may have failed to provide sufficient adherence of an aluminum pigment to a variety of writing surfaces. In addition, combined use of a colorant other than an aluminum pigment may have failed to impart sufficient scratch resistance to markings.

Patent Document 2 discloses, as a spray tool set using a writing utensil in the form of an airbrush, a spray tool (airbrush) set including: a writing utensil containing an ink composition in a barrel and provided with a fiber or synthetic resin pen body at a writing tip; and a spraying tool equipped with the writing utensil and ejecting high-pressure gas to the writing tip.

However, the spraying tool (airbrush) set using the writing utensil in the form of an airbrush simply sprays ink for writing utensils and may have failed to provide sufficient scratch resistance.

CITATION LIST

Patent Literature

Patent Document 1: JP 2017-52836 A
Patent Document 2: JP 3173489 UM-B

SUMMARY OF INVENTION

Technical Problem

Thus, there is a demand for: an oil-based ink composition for writing utensils that exhibits sufficient adherence to writing surfaces of various materials and scratch resistance, has an excellent metallic luster, and can also be used as an airbrush unit; a writing utensil using such an oil-based ink composition; and an airbrush unit using the same. The present invention is required to provide those.

Solution to Problem

As a result of diligent research, the present inventors found that the problems described above can be solved by the following means and completed the present invention. That is, the present invention is as follows:
(1) An oil-based ink composition for writing utensils, the composition containing at least an aluminum pigment, a colorant, a resin, an organic solvent, and a polydimethylsiloxane, the polydimethylsiloxane having polyether-modifying groups at both ends, and a total number of hydroxyl groups on the polyether-modifying groups is 3 or greater.
(2) The oil-based ink composition for writing utensils according to (1) above, wherein at least one of the polyether-modifying groups has a hyperbranched molecular skeleton.
(3) The oil-based ink composition for writing utensils according to (1) or (2) above, wherein a content of the polydimethylsiloxane is 0.005 to 10 mass % based on a total mass of the oil-based ink composition for writing utensils.
(4) The oil-based ink composition for writing utensils according to any one of (1) to (3) above, wherein the aluminum pigment is a leafing type aluminum pigment.
(5) A writing utensil including at least an ink storage portion, a writing portion, and a holding portion, wherein the oil-based ink composition for writing utensils described in any one of (1) to (4) is stored in the ink storage portion.
(6) An airbrush unit including an airbrush and the writing utensil described in (5) above, wherein an oil-based ink composition is sprayed by way of air ejected from the airbrush.

Advantageous Effects of Invention

The present invention can provide: an oil-based ink composition for writing utensils that exhibits sufficient adherence to writing surfaces of various materials and scratch resistance, has an excellent metallic luster, and can also be used as an airbrush unit; the writing utensil using such an oil-based ink composition for writing utensils; and the airbrush unit using the same.

BRIEF DESCRIPTION OF DRAWINGS

FIG. 1 is a schematic view illustrating an example of an airbrush unit according to the present invention.

DESCRIPTION OF EMBODIMENTS

Embodiments of the present invention will be described in detail below. Oil-based ink composition for writing utensils An oil-based ink composition for writing utensils according to the present invention contains at least an aluminum pigment, a colorant, a resin, an organic solvent, and a polydimethylsiloxane, the polydimethylsiloxane having polyether-modifying groups at both ends, and a total number of hydroxyl groups on the polyether-modifying groups being 3 or greater.

As mentioned for Patent Document 1, the oil-based ink composition for writing utensils, the composition formulated with an aluminum pigment, is formulated with a resin component for the purpose of improving adherence of a marking.

In contrast, the present inventors newly focused on the surface of the ink composition after writing on a writing surface. More specifically, the present inventors reduced the coefficient of friction of a marking after writing on a writing surface so that the marking is less susceptible to friction force, and found that this can improve the scratch resistance of the marking.

The present inventors clarified that such reduction of the coefficient of friction of the marking can be achieved particularly by enabling the main chain of the polydimethylsiloxane to be retained on the surface of the marking.

In contrast to a conventional oil-based ink composition for writing utensils, the wettability of the ink composition to the writing surface is improved, thereby improving adhesive properties. In addition, on the surface of an object to be adhered containing an aluminum pigment, a colorant, a resin, and an organic solvent, a polyether-modifying groups of a polydimethylsiloxane attach to an object to be adhered by way of a hydroxyl group, and the main chain is exposed on the surface of the oil-based ink composition for writing utensils.

In the oil-based ink composition for writing utensils of the present invention, as the polyether-modifying groups of the polydimethylsiloxane have a plurality of hydroxyl groups, it is considered that the polydimethylsiloxane is allowed to have stronger affinity with the object to be adhered. As a result, the main chain of the polydimethylsiloxane is maintained on the surface of the oil-based ink composition for writing utensils even when friction force is applied to the marking, and the presence of this main chain is considered to improve the scratch resistance of the marking.

Furthermore, the present inventors found that an ink composition using a colorant other than an aluminum pigment in combination also improves the scratch resistance of a marking on a non-absorbing surface. That is, scratching a marking of an ink composition using an aluminum pigment and a colorant in combination on a non-absorbent surface causes a problem of selective peeling of the colorant and change of the color of the drawn line to silver; however, the present inventors found that the oil-based ink composition for writing utensils of the present invention is less subject to peeling of the colorant. In particular, use of a leafing type aluminum pigment makes the problem noticeable, and thus the oil-based ink composition for writing utensils of the present invention is able to exhibit a marked improving effect.

The mechanism for this is not obvious but is presumed to be as follows. On the marking, an adhering resin is present between the aluminum pigment and a writing surface (non-absorbing surface) and exhibits adherence. On the other hand, the adhering resin is in a state of being less likely to be present between the aluminum pigment and the colorant present between it and the gas-liquid interface, however, the polyether-modifying groups of the polydimethylsiloxane have affinity with the colorant and the aluminum pigment by way of hydroxyl groups, additionally the coefficient of friction decreases to improve the scratch resistance.

In addition, a leafing type of aluminum pigment is surface-treated with a surfactant such as stearic acid on the surface, and thus presumably forms a state where the adhering resin is further less likely to be present than in a non-leafing type. Thus, the oil-based ink composition for writing utensils of the present invention is expected to exhibit a noticeable improving effect.

Each component and the like of the present invention will be described below.

Aluminum Pigment

The aluminum pigment used in the present invention is typically manufactured by grinding or pulverizing aluminum in the presence of a grinding medium liquid in a ball mill or attritor mill using a grinding aid. As long as aluminum pigment is usable as a pigment or the like for an oil-based ink, its manufacturing method, properties (such as powder or paste), particle size (average particle size and thickness), and the like are not particularly limited. Examples of the aluminum pigment include a leafing type, which makes arrangement on the surface layer of an ink film, and a non-leafing type (including a resin coating type), which makes uniform dispersing arrangement in an ink film. Specifically, the one commercially available for oil-based inks can be used.

Examples of the aluminum pigment that can be used include 13G, 13GH, and 15GH (which are leafing types), and FD-4070 and FW-610 (which are non-leafing types) [which are available from Asahi Kasei Chemicals Corporation]; 0700M and 0870ME (which are leafing types), and 2172 and 1200M (which are non-leafing types) [which are available from Toyo Aluminum K.K.]; and they can be used alone or in a mixture of two or more. Of these, a leafing type, which produces a marking with stronger luster, is preferably used.

The lower limit of the content of the aluminum pigment in the oil-based ink composition for writing utensils of the present invention is 0.3 mass % or greater, 1 mass % or greater, 2 mass % or greater, 3 mass % or greater, and particularly preferably 5 mass % or greater, and, on the other hand, the upper limit is 25 mass % or less, 20 mass % or less, and particularly preferably 15 mass % or less.

With a content of the aluminum pigment of less than 0.3 mass %, metallic luster would be less likely to be produced, and, on the other hand, with a content of the aluminum pigment of greater than 25 mass %, clogging in the ink circulation portion of the writing utensil would be likely to be caused.

Colorant Other than Aluminum Pigment

In the present invention, examples of a colorant other than the above aluminum pigment include various colorants used in inks known in the art, such as dyes, pigments, or mixtures of a dye and a pigment.

Anyone of the following and their solutions can be used as the dye that can be used in the present invention: dyes used in ordinary dye ink compositions, such as direct dyes, acid dyes, basic dyes, mordant/acid mordant dyes, ethanol-soluble dyes, azoic dyes, sulfurized/sulfurized vat dyes, vat dyes, disperse dyes, oil-soluble dyes, food dyes, metal complex dyes, salt-forming dyes, and dyes obtained by dyeing a resin with a dye.

Examples of the pigment that can be used in the present invention include inorganic pigments, such as carbon black, graphite, and titanium dioxide; extender pigments, such as talc, silica, alumina, mica, and alumina silicate; organic pigments, such as azo-based pigments, condensed azo-based pigments, phthalocyanine-based pigments, anthraquinone pigments, quinacdorine pigments, isoindolinone-based pigments, diketopyrrolopyrrole-based pigments, and various lake pigments; fluorescent pigments; and pearl pigments.

As the colorant used in the present invention, the dye or pigment described above can be used alone or in a mixture.

The content of the colorant other than the aluminum pigment in the oil-based ink composition for writing utensils of the present invention is 0.1 mass % or greater, or more preferably 1 mass % or greater, in terms of coloring power (concentration, color development), and, on the other hand, 30 mass % or less, or more preferably 20 mass % or less, in terms of stability of the oil-based ink composition.

Resin

The following can be used as the resin used in the present invention: for example, a ketone resin, a sulfonamide resin, a maleic resin, a terpene resin, a terpene phenolic resin, an ester gum, a xylene resin, an alkyd resin, a phenolic resin, rosin, polyvinylpyrrolidone, polyvinyl butyral, polyvinyl alcohol, an acrylic-based resin, a melamine-based resin, a nitrocellulose-based resin, or a urea resin; and a derivative of them. Of these, a nitrocellulose resin, which gives glossy feeling to a marking, is preferably used.

The lower limit of the content of the resin in the oil-based ink composition for writing utensils of the present invention is 1 mass % or greater, 2 mass % or greater, 3 mass % or greater, and particularly preferably 5 mass % or greater, and, on the other hand, the upper limit is 25 mass % or less, 20 mass % or less, and particularly preferably 15 mass % or less.

With a content of the resin of less than 1 mass %, sufficient adherence may not be exhibited, and, on the other hand, with a content of the aluminum pigment of greater than 25 mass %, the viscosity of the ink may increase and writing properties or ejection properties from the airbrush may be impaired.

Organic Solvent

The following can be used as the organic solvent used in the present invention: for example, an aromatic, an alcohol, a polyhydric alcohol, a glycol ether, a hydrocarbon, or an ester. These solvents may be used alone or two or more in combination.

The following can be used as the aromatic: for example, benzyl alcohol, ethylene glycol monophenyl ether, ethylene glycol monobenzyl ether, propylene glycol monophenyl ether, diethylene glycol monophenyl ether, an alkylsulfonic phenyl ester, butyl phthalate, ethylhexyl phthalate, tridecyl phthalate, ethylhexyl trimellitate, diethylene glycol dibenzoate, or dipropylene glycol dibenzoate.

The following can be used as the alcohol: for example, ethanol, n-propanol, isopropanol, n-butanol, isobutanol, tert-butyl alcohol, 1-pentanol, isoamyl alcohol, sec-amyl alcohol, 3-pentanol, tert-amyl alcohol, n-hexanol, methyl amyl alcohol, 2-ethylbutanol, n-heptanol, 2-heptanol, 3-heptanol, n-octanol, 2-octanol, 2-ethylhexanol, 3,5,5-trimethylhexanol, nonanol, n-decanol, undecanol, n-decanol, trimethylnonyl alcohol, tetradecanol, heptadecanol, cyclohexanol, or 2-methylcyclohexanol.

The following can be used as the polyhydric alcohol: for example, ethylene glycol, diethylene glycol, 3-methyl-1,3butanediol, triethylene glycol, dipropylene glycol, 1,3propanediol, 1,3butanediol, 1,5pentanediol, hexylene glycol, or octylene glycol.

The following can be used as the glycol ether: for example, methyl isopropyl ether, ethyl ether, ethyl propyl ether, ethyl butyl ether, isopropyl ether, butyl ether, hexyl ether, 2-ethyl hexyl ether, ethylene glycol monohexyl ether, ethylene glycol mono-2-ethyl butyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monobutyl ether, 3-methyl-3-methoxy-1-butanol, 3-methoxy-1-butanol, propylene glycol monomethyl ether, propylene glycol monoethyl ether, propylene glycol monopropyl ether, propylene glycol monobutyl ether, propylene glycol tertiary butyl ether dipropylene glycol monomethyl ether, dipropylene glycol monoethyl ether, dipropylene glycol monopropyl ether, dipropylene glycol monobutyl ether, tripropylene glycol monomethyl ether, tripropylene glycol monobutyl ether, or tetrapropylene glycol monobutyl ether.

The following can be used as the hydrocarbon: for example, a linear hydrocarbon, such as hexane, isohexane, heptane, octane, nonane, or decane; or a cyclic hydrocarbon, such as cyclohexane, methylcyclohexane, or ethylcyclohexane.

The following can be used as the ester: for example, propylene glycol methyl ether acetate, propylene glycol diacetate, 3-methyl-3-methoxybutyl acetate, propylene glycol ethyl ether acetate, ethylene glycol ethyl ether acetate, butyl formate, isobutyl formate, isoamyl formate, propyl acetate, butyl acetate, isopropyl acetate, isobutyl acetate, isoamyl acetate, methyl propionate, ethyl propionate, propyl propionate, isobutyl propionate, isoamyl propionate, methyl butyrate, ethyl butyrate, propyl butyrate, methyl isobutyrate, ethyl isobutyrate, propyl isobutyrate, methyl valerate, ethyl valerate, propyl valerate, methyl isovalerate, ethyl isovalerate, propyl isovalerate, methyl trimethylacetate, ethyl trimethylacetate, propyl trimethylacetate, methyl caproate, ethyl caproate, propyl caproate, methyl caprylate, ethyl caprylate, propyl caprylate, methyl laurate, ethyl laurate, methyl oleate, ethyl oleate, triglyceride caprylate, tributyl citrate acetate, octyl oxystearate, propylene glycol monoricinoleate, methyl 2-hydroxyisobutyrate, or 3-methoxybutyl acetate.

The content of these organic solvents is the rest after the oil-based ink composition for writing utensils of the present invention contains each predetermined content of the aluminum pigment, the colorant, and the resin described above, and the polydimethylsiloxane to be described later.

Preferably, for reasons, such as drying rate of a marking, adhesive properties to a writing surface, ink ejection properties in the use as an airbrush unit, uniformity of a coated surface, and safety, the content of the solvent in the oil-based ink composition for writing utensils of the present invention is preferably from 99 to 60 mass % and more preferably from 95 to 70 mass %.

Even more preferably, ethyl alcohol and/or propylene glycol monomethyl ether are desirably contained in 50 mass % or greater of the organic solvent(s) in the ink composition. Furthermore, benzyl alcohol and/or ethylene glycol monophenyl ether may be used in combination for the purpose of adjusting the drying rate of the marking or the like.

Polydimethylsiloxane

The polydimethylsiloxane used in the present invention is a compound having the following general formula:

[Chem. 1]

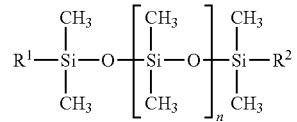

In particular, the polydimethylsiloxane in the oil-based ink composition for writing utensils of the present invention is a both-end-modified type of polyether-modified polydimethylsiloxane having a polyether-modifying group at both ends, that is, at positions $R^1$ and $R^2$ in the above general formula. In the above formula, n represents an integer from 0 to 5000.

Polyether-Modifying Group

The polyether-modifying group represents, for example, a group having the following polyether structure at least in a portion of the group:

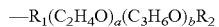

where $R_1$ represents an alkyl group having from 1 to 10 carbon atoms; and $R_2$ represents any of a hydrogen atom, an alkyl group having from 1 to 50 carbon atoms, or an aryl group; a represents an integer from 1 to 50; and b represents an integer from 1 to 50.

Preferably, at least one of the polyether-modifying groups has a hyperbranched molecular skeleton from the viewpoint of increasing the number of hydroxyl groups and thereby increasing the scratch resistance of a coating.

Hyperbranched Molecular Skeleton

The atoms constituting the hyperbranched molecular backbone can be all, some, or one of C, Si, O, and H.

In addition, the hyperbranched molecular skeleton can have a plurality of branches, for example, two or more, three or more, five or more, seven or more, or ten or more branches, and 100 or less, 80 or less, 50 or less, or 30 or less branches.

In particular, the polyether-modifying group having a hyperbranched molecular skeleton can have the above polyether structure in at least one branched portion. In addition, such polyether-modifying groups may have hydroxyl groups at all or some of the ends of the branched portions, and consequently the polyether-modifying groups as a whole may have a plurality of hydroxyl groups (—OH).

The total number of hydroxyl groups on the polyether-modifying groups needs to be at least 3, or greater. Preferably, this total number is desirably 5 or greater, 7 or greater, or more preferably 10 or greater, and the upper limit is 100 or less, 80 or less, 50 or less, 40 or less, or more preferably 30 or less.

With a total number of hydroxyl groups on the polyether-modifying groups being less than 3, the scratch resistance would be somewhat insufficient, and, on the other hand, with a total number being greater than 100, the stability of the oil-based ink composition may be impaired.

In the present invention, the calculation of the total number of hydroxyl groups on the polyether-modifying groups and the like can be performed by measuring the hydroxyl value.

Examples of the polydimethylsiloxane of such characteristics that can be specifically used include BYK-SILCLEAN 3720 (trade name) available from BYK and Protect 5000N (trade name) from TEGO.

The content of the polydimethylsiloxane of the above characteristics in the oil-based ink composition for writing utensils of the present invention is preferably 0.005 to 10 mass % from the viewpoint of the effects described above.

The lower limit of the content is 0.005 mass % or greater, preferably 0.01 mass % or greater, 0.05 mass % or greater, 0.1 mass % or greater, 0.3 mass % or greater, and particularly 0.5 mass % or greater, which is desirable from the viewpoint of allowing a sufficient amount of the polydimethylsiloxane to be present on a writing surface and thereby improving the scratch resistance, and, on the other hand, the upper limit is preferably 10 mass % or less, 8 mass % or less, or 5 mass % or less from the viewpoint of allowing the oil-based ink composition for writing utensils to adhere firmly to a writing surface.

Additional Component

The oil-based ink composition for writing utensils of the present invention may contain an additional optional component within a range that does not impair the effects of the present invention. Examples of the additional component include leveling agents, antirust agents, preservatives, and lubricants.

Examples of the leveling agent that can be used include fluorine-based surfactants and phosphate ester-based surfactants.

Method of Manufacturing Oil-Based Ink Composition for Writing Utensils

The oil-based ink composition for writing utensils of the present invention can be manufactured by a method known in the art by mixing at least the aluminum pigment, the resin, the organic solvent, and the polydimethylsiloxane of the above characteristics using a stirring device, such as a disper.

The oil-based ink composition for writing utensils of the present invention thus constituted contains at least the aluminum pigment, colorant, resin, organic solvent, and polydimethylsiloxane described above, the polydimethylsiloxane having polyether-modifying groups at both ends, and a total number of hydroxyl groups on the polyether-modifying groups is 3 or greater. Such a constitution allows the oil-based ink composition for writing utensils to exhibit sufficient adherence and scratch resistance to writing surfaces of various materials (such as paper, resin films, and metals; the same applies hereinafter), and to have an excellent metallic luster.

Writing Utensil

The writing utensil of the present invention includes at least an ink storage portion, a writing portion, and a holding portion. In the ink storage portion, the oil-based ink composition for writing utensils of the present invention of the above formulation characteristics is stored.

The type of writing utensil of the present invention may be a felt tip pen or a ballpoint pen.

Here, a "marking pen" in the present specification means a pen having a mechanism of supplying ink stored in an ink storage portion to a writing portion made of a resin by capillarity. It includes a pen referred to by a person skilled in the art as a "felt tip pen". In addition, a "ballpoint pen" in the present specification refers to a pen having a mechanism of exuding ink stored in an ink storage portion by rotation of a ball provided in a writing portion.

Ink Storage Portion

In the ink storage portion, the oil-based ink composition for writing utensils constituted as described above is stored.

In addition, for the ink storage portion, any member capable of storing ink and supplying the ink to the writing portion can be used.

Writing Portion

The writing portion may be constituted of a material voluntarily selected according to the application of the writing utensil. When the writing utensil of the present invention is a felt tip pen, examples of the writing portion include fiber wicks and plastic wicks. When the writing utensil of the present invention is a ballpoint pen, the writing portion can be a writing portion provided with a ball pen tip on a tip portion.

Such a constitution of the writing utensil provides a suitable writing utensil, such as a ballpoint pen and a marking pen, loaded with the oil-based ink composition for writing utensils exhibiting sufficient adherence to writing surfaces of various materials and scratch resistance, and having excellent metallic luster.

Airbrush Unit

An example of an airbrush unit of the present invention will now be described with reference to the drawing.

As illustrated in FIG. 1, an airbrush unit 100 of the present invention is an airbrush unit 100 including an airbrush 10 and a writing utensil 20 of the present invention constituted as described above, in which the oil-based ink composition of the above formulation characteristics is sprayed by way of air ejected from the airbrush 10.

The airbrush unit 100 of the present invention may include a voluntarily selected connecting member 30 for connecting the airbrush 10 and the writing utensil 20.

The airbrush unit 100 of the present invention can spray ink deposited in the writing portion 22 to spread out from the writing portion 22 as illustrated by the five arrows in FIG. 1, by ejecting air from a nozzle 12 in a direction toward the writing portion 22 of the writing utensil 20, as illustrated by the outline arrow in FIG. 1, for example, the writing portion 22 having a writing tip in the form of a convexly curved surface.

Airbrush

As illustrated in FIG. 1, the airbrush 10 may include the nozzle 12 and a gas supply member 14. The nozzle 12 and the gas supply member 14 may be integrally formed or may be connected to each other via a hollow member such as a hose.

The nozzle 12 is any nozzle capable of injecting high-pressure gas to the writing portion 22 of the writing utensil 20 and is not particularly limited.

The gas supply member 14 is any member capable of supplying high-pressure gas to the nozzle 12 and is not particularly limited. For example, the gas supply member 14 may be constituted of a member through which a human blows air frommouth to inject the air, a member to generate high-pressure gas by compressing and deforming an elastic body portion of a blower pump by hand, and a piston and a cylinder.

In addition, the gas supply member 14 may be a member in which a piston of a pump is reciprocated by hand, a member using a spray can filled with liquefied gas, or a member electrically generating compressed air, for example, a member constituted of at least a motor and a high-pressure gas generator, such as a diaphragm, connected to the motor via a mechanism for converting rotational motion to reciprocating motion, the member feeding high-pressure gas from a high-pressure air generator to an injection port.

Connecting Member

The connecting member 30 is a voluntarily selected member for connecting the airbrush 10 and the writing utensil 20. The connecting member 30 is any member for physically connecting the airbrush 10 and the writing utensil 20 and is not particularly limited.

The airbrush unit of the present invention thus constituted includes the airbrush and the writing utensil constituted as described above, in which the oil-based ink composition of the above formulation characteristics is sprayed by way of air ejected from the airbrush. Such a constitution provides the airbrush unit capable of spraying the oil-based ink composition exhibiting sufficient adherence to coated surfaces of various materials and scratch resistance, and having excellent metallic luster.

Example 1

The present invention will now be specifically described with reference to examples and comparative examples; however, the present invention is not limited to these.

Examples 1 to 6 and Comparative Examples 1 to 5

Each oil-based ink composition for writing utensils was prepared by the following method.

Preparation of Oil-Based Ink Composition for Writing Utensils

Example 1

An oil-based ink composition for writing utensils (100 parts by mass) of Example 1 was prepared by stirring to mix an aluminum pigment (13G: leafing type, available from Asahi Kasei Corporation, 6 parts by mass), a dye (Spilon Red C-GH, available from Hodagaya Chemical Co., Ltd., 3 parts by mass), a nitrocellulose (DHX5-10, available from Nobel, 5 parts by mass) as a resin, and a hydroxyl group-containing polyether-modified polydimethylsiloxane [BYK-SILCLEAN 3720, available from BYK, active component 25%, solvent propylene glycol monomethyl ether (PGM), 4 parts by mass (1 part by mass of the active component and 3 parts by mass of propylene glycol monomethyl ether)]; and propylene glycol monomethyl ether (57 parts by mass), ethanol (20 parts by mass), and benzyl alcohol (5 parts by mass) as solvents.

Example 2

An oil-based ink composition for writing utensils (100 parts by mass) of Example 2 was prepared in the same manner as in Example 1 except for changing the parts by mass of the hydroxyl group-containing polyether-modified polydimethylsiloxane (BYK-SILCLEAN 3720, available from BYK Corporation) to 12 parts by mass (3 parts by mass of the active component, 9 parts by mass of propylene glycol monomethyl ether) and changing the parts by mass of propylene glycol monomethyl ether to 49 parts by mass.

Example 3

An oil-based ink composition for writing utensils (100 parts by mass) of Example 3 was prepared by stirring to mix an aluminum pigment (13G: leafing type, available from Asahi Kasei Corporation, 6 parts by mass), a dye (Spilon Red C-GH, available from Hodagaya Chemical Co., Ltd., 3 parts by mass) as a colorant, a nitrocellulose (DHX5-10, available from Nobel, 5 parts by mass) as a resin, and a hydroxyl group-containing polyether-modified polydimethylsiloxane (Protect 5000N, TEGO, 3 parts by mass); and propylene glycol monomethyl ether (63 parts by mass) and ethanol (20 parts by mass) as solvents.

Example 4

An oil-based ink composition for writing utensils (100 parts by mass) of Example 4 was prepared in the same manner as in Example 3 except for changing the parts by mass of the hydroxyl group-containing polyether-modified polydimethylsiloxane (Protect 5000N, TEGO) to 6 parts by mass and changing the parts by mass of propylene glycol monomethyl ether to 60 parts by mass.

Example 5

An oil-based ink composition for writing utensils (100 parts by mass) of Example 5 was prepared in the same manner as in Example 1 except for changing the aluminum pigment (13G: leafing type, available from Asahi Kasei Corporation, 6 parts by mass) to an aluminum pigment (1200M: non-leafing type, Toyo Aluminum K.K., 6 parts by mass).

Example 6

An oil-based ink composition for writing utensils (100 parts by mass) of Example 6 was prepared in the same manner as in Example 1 except for changing the nitrocellulose (DHX5-10, available from. Nobel, 5 parts by mass) to a urea/aliphatic aldehyde resin (Laropal A81, available from BASF, 5 parts by mass).

Comparative Example 1

An oil-based ink composition for writing utensils of Comparative Example 1 was prepared in the same manner as in Example 1 except for using a polydimethylsiloxane modified at both ends with carbinols (KF-6003, available from Shin-Etsu Silicone Co., Ltd., 1 part by mass) instead of the hydroxyl group-containing polydimethylsiloxane (BYK-SILCLEAN 3720, available from BYK) and using 60 parts by mass of propylene glycol monomethyl ether.

Comparative Example 2

An oil-based ink composition for writing utensils of Comparative Example 2 was prepared in the same manner as in Example 1 except for using PEG-32 methyl ether dimethicone (KF-6004, Shin-Etsu Silicone Co., Ltd., 1 part by mass) instead of the hydroxyl group-containing polydimethylsiloxane (BYK-SILCLEAN 3720, available from BYK) and using 60 parts by mass of propylene glycol monomethyl ether.

Comparative Example 3

An oil-based ink composition for writing utensils of Comparative Example 2 was prepared in the same manner as in Example 1 except for using —R($C_2H_4O$)$_a$ ($C_3H_6O$)$_b$H modified at both ends with a polyether (X-22-4952, available from Shin-Etsu Silicone Co., Ltd., 1 part by mass) instead of the hydroxyl group-containing polydimethylsiloxane (BYK-SILCLEAN 3720, BYK) and using 60 parts by mass of propylene glycol monomethyl ether.

Comparative Example 4

An oil-based ink composition for writing utensils of Comparative Example 4 was prepared in the same manner as in Example 1 except for not using the hydroxyl group-containing polydimethylsiloxane (BYK-SILCLEAN 3720, available from BYK) and using 61 parts by mass of propylene glycol monomethyl ether.

Comparative Example 5

An oil-based ink composition for writing utensils of Comparative Example 5 was prepared in the same manner as in Comparative Example 4 except for changing the aluminum pigment (13G: leafing type, available from Asahi Kasei Corporation, 6 parts by mass) to an aluminum pigment (1200M: non-leafing type, Toyo Aluminum K.K., 6 parts by mass).

Using each oil-based ink composition for writing utensils of the examples and comparative examples obtained above, writing utensils constituted as follows were produced and evaluated for metallic luster of a marking and scratch resistance by the following evaluation methods. In addition, each writing utensil above was used to be connected to an airbrush following FIG. 1, and an airbrush unit was produced and evaluated for coating unevenness by the following evaluation method.

Table 1 below shows the formulation composition and each evaluation result of each oil-based ink composition for writing utensils of the examples and comparative examples.
Production of Writing Utensil A marker was produced by filling a PX-21 [product name "Paint Marker", pen wick: a round wick for fine writing (acrylic fiber wick)] available from Mitsubishi Pencil Co., Ltd. with each oil-based ink composition for writing utensils of the examples and comparative examples obtained above. The metallic luster and scratch resistance of the marking was then evaluated using the round wick for fine writing.
Evaluation Methods
Metallic Luster of Marking The produced marker was used to write on a polyethylene terephthalate (PET) film with. After drying the marking, the metallic luster of the marking was evaluated according to the following evaluation criteria. The evaluation criteria for the metallic luster of the markings are as follows.

A: strong metallic luster.
B: metallic luster.
C: weak metallic luster.
Scratch Resistance The produced marker was used to write on a polyethylene terephthalate (PET) film with. After dried, the marking was scratched with a load of about 100 gf using a cotton swab, and the scratch resistance of the marking was evaluated according to the following evaluation criteria.

The evaluation criteria for the scratch resistance are as follows.

A: The marking remained almost unchanged when observed after testing.
B: The colorant slightly peeled off when observed after testing.
C: The colorant largely peeled off when observed after testing.
D: The colorant peeled off to the extent that no colorant remained when observed after testing.
Production of Airbrush Unit Each writing utensil (marker) above was connected to an airbrush following FIG. 1, and an airbrush unit was produced. The airbrush used was constituted of a gas supply member and a nozzle connected to it, the nozzle ejecting the gas.
Evaluation of Coating Properties A cylindrical polypropylene object with a diameter of 8 mm and a height of 8 cm to be coated was disposed vertically with the height direction plumb, and the ink was sprayed to coat the entire circumference of the object using the produced airbrush unit. The coated object was observed under a microscope to evaluate the appearance of the ink (coating unevenness), which is an indication of coating properties.

The evaluation criteria for coating unevenness (such as dripping) are as follows:
- A: No unevenness is observed, and a uniform coating is formed.
- B: Some unevenness is observed, but a substantially uniform coating is formed.
- C: A lot of unevenness is observed, and the appearance of the coating is impaired.

TABLE 1

(Total amount of 100 mass %)

|  |  |  | Examples | | | | | | Comparative Examples | | | | |
|---|---|---|---|---|---|---|---|---|---|---|---|---|---|
|  |  |  | 1 | 2 | 3 | 4 | 5 | 6 | 1 | 2 | 3 | 4 | 5 |
| Formulation components | Aluminum pigment A | *1 | 6 | 6 | 6 | 6 |  | 6 | 6 | 6 | 6 | 6 |  |
|  | Aluminum pigment B | *2 |  |  |  |  | 6 |  |  |  |  |  | 6 |
|  | Colorant (red dye) | *3 | 3 | 3 | 3 | 3 | 3 | 3 | 3 | 3 | 3 | 3 | 3 |
|  | Resin A | *4 | 5 | 5 | 5 | 5 | 5 |  | 5 | 5 | 5 | 5 | 5 |
|  | Resin B | *5 |  |  |  |  |  | 5 |  |  |  |  |  |
|  | Silicone A (Active component 25%) | *6 | 4 | 12 |  |  | 4 | 4 |  |  |  |  |  |
|  | Silicone B (Active component 100%) | *7 |  |  | 3 | 6 |  |  |  |  |  |  |  |
|  | Silicone C (Active component 100%) | *8 |  |  |  |  |  |  | 1 |  |  |  |  |
|  | Silicone D (Active component 100%) | *9 |  |  |  |  |  |  |  | 1 |  |  |  |
|  | Silicone E (Active component 100%) | *10 |  |  |  |  |  |  |  |  | 1 |  |  |
|  | Number of hydroxyl groups of each end group in each of silicones A to E above |  | 3 or greater | 3 or greater | 3 or greater | 3 or greater | 3 or greater | 3 or greater | 1 | 0 | 1 | — | — |
|  | Ethyl alcohol |  | 20 | 20 | 20 | 20 | 20 | 20 | 20 | 20 | 20 | 20 | 20 |
|  | Propylene glycol monomethyl ether |  | 57 | 49 | 63 | 60 | 57 | 57 | 60 | 60 | 60 | 61 | 61 |
|  | Benzyl alcohol |  | 5 | 5 |  |  | 5 | 5 | 5 | 5 | 5 | 5 | 5 |
| Evaluation | Metallic luster of marking |  | A | A | A | A | B | A | A | A | A | A | B |
|  | Scratch resistance in writing utensil |  | A | A | A | A | A | A | C | C | C | D | C |
|  | Coating unevenness in airbrush |  | A | A | A | A | A | A | A | A | A | A | A |

Described *1 to *10 are as the followings.
*1: Leafing type (13G, available from Asahi Kasei Corporation)
*2: Non-leafing type (1200M, available from Toyo Aluminum K.K.)
*3: Spilon Red C-GH, available from Hodagaya Chemical Co., Ltd.
*4: Nitrocellulose (DHX5-10, available from Nobel)
*5: Urea/aliphatic aldehyde resin (Laropal A81, available from BASF)
*6: Hydroxyl group-containing polyether-modified polydimethylsiloxane (BYK-SILCLEAN 3720, available from BYK)
*7: Hydroxyl group-containing polydimethylsiloxane (Protect 5000N, available from TEGO)
*8: —ROH modified at both ends with a carbinol (KF-6003, available from Shin-Etsu Silicone Co., Ltd.)
*9: PEG-32 methyl ether dimethicone (KF-6004, Shin-Etsu Silicone Co., Ltd.)
*10: —R($C_2H_4O$)$_a$($C_3H_6O$)$_b$H modified at both ends with a polyether (X-22-4952, Shin-Etsu Silicone Co., Ltd.)

From Table 1 above, the oil-based ink compositions for writing utensils of Examples 1 to 6 using the polydimethylsiloxane having a polyether-modifying group at both ends and a total number of hydroxyl groups on the polyether-modifying groups of 3 or greater successfully achieved results of exhibiting metallic luster and excellent scratch resistance after writing. In addition, good results were successfully obtained also as an airbrush unit.

REFERENCE SIGNS LIST

- 10 Airbrush
- 12 Nozzle
- 14 Gas supply member
- 20 Writing utensil
- 22 Writing portion
- 30 Connecting member
- 100 Airbrush unit

The invention claimed is:

1. An oil-based ink composition for writing utensils, comprising at least an aluminum pigment, a colorant, a resin, an organic solvent, and a polydimethylsiloxane, the polydimethylsiloxane having polyether-modifying groups at both ends, and a total number of the hydroxyl groups on the polyether-modifying groups being 3 or greater, and the oil-based ink composition being capable of producing a marking having metallic luster,
wherein at least one of the polyether-modifying groups has a hyperbranched molecular skeleton having two or more and 100 or less branches,
wherein a content of the polydimethylsiloxane is 0.005 to 10 mass % based on a total mass of the oil-based ink composition for writing utensils, and
wherein a content of the aluminum pigment is 0.3 mass % to 25 mass % based on the total mass of the oil-based ink composition for writing utensils.

2. The oil-based ink composition for writing utensils according to claim 1, wherein the aluminum pigment is a leafing type aluminum pigment.

3. The oil-based ink composition for writing utensils according to claim 1, wherein the oil-based ink composition exhibits adherence to a writing surface and scratch resistance.

4. The oil-based ink composition for writing utensils according to claim 1, wherein the oil-based ink composition is capable of producing a marking which remains substantially unchanged after being scratched with a load of about 100 gf using a cotton swab.

* * * * *